US009471324B2

(12) United States Patent
Gonion

(10) Patent No.: US 9,471,324 B2
(45) Date of Patent: Oct. 18, 2016

(54) CONCURRENT EXECUTION OF HETEROGENEOUS VECTOR INSTRUCTIONS

(71) Applicant: Apple Inc., Cupertino, CA (US)

(72) Inventor: Jeffry E. Gonion, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/154,381

(22) Filed: May 13, 2016

(65) Prior Publication Data

US 2016/0253179 A1    Sep. 1, 2016

Related U.S. Application Data

(63) Continuation of application No. 13/904,660, filed on May 29, 2013, now Pat. No. 9,354,891.

(51) Int. Cl.
*G06F 15/00*     (2006.01)
*G06F 9/45*      (2006.01)
*G06F 9/38*      (2006.01)
*G06F 9/30*      (2006.01)

(52) U.S. Cl.
CPC ......... *G06F 9/3836* (2013.01); *G06F 9/30036* (2013.01)

(58) Field of Classification Search
None
See application file for complete search history.

(56) References Cited

U.S. PATENT DOCUMENTS

| | | | |
|---|---|---|---|
| 6,055,619 A * | 4/2000 | North | G10H 7/002 704/270 |
| 7,028,066 B2 | 4/2006 | Arakawa et al. | |
| 7,519,646 B2 | 4/2009 | Kaul et al. | |
| 7,975,134 B2 | 7/2011 | Gonion | |
| 8,505,002 B2 | 8/2013 | Yehia et al. | |
| 2003/0167460 A1 | 9/2003 | Desai et al. | |
| 2004/0193837 A1 * | 9/2004 | Devaney | G06F 9/30036 712/3 |
| 2009/0158012 A1 * | 6/2009 | Hansen | G06F 9/30 712/222 |
| 2010/0274988 A1 | 10/2010 | Mimar | |
| 2010/0299671 A1 * | 11/2010 | Kinsey | G06F 9/4552 718/104 |
| 2013/0159667 A1 | 6/2013 | Garbacea | |

* cited by examiner

*Primary Examiner* — Michael Sun
(74) *Attorney, Agent, or Firm* — Anthony M. Petro; Meyertons, Hood, Kivlin, Kowert & Goetzel, P.C.

(57) ABSTRACT

A processor may include a vector functional unit that supports concurrent operations on multiple data elements of a maximum element size. The functional unit may also support concurrent execution of multiple distinct vector program instructions, where the multiple vector instructions each operate on multiple data elements of less than the maximum element size.

20 Claims, 9 Drawing Sheets

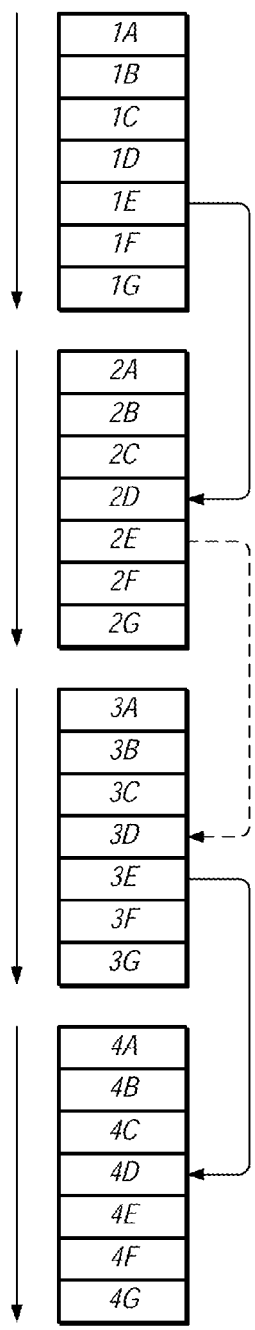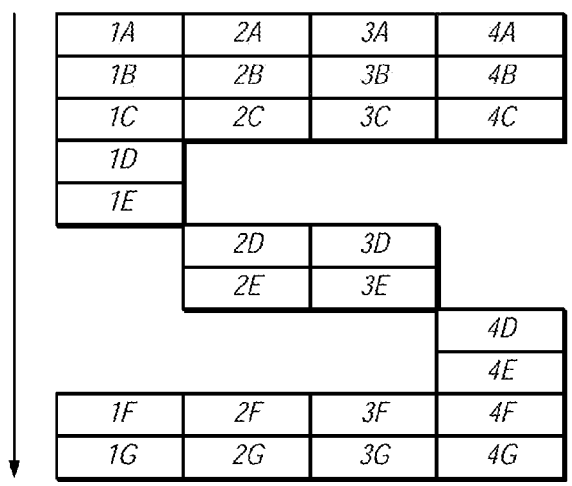
FIG. 3

| | | | | | |
|---|---|---|---|---|---|
| x = 0, | A[x] = 1, | r = 1, | s = 0, | B[x] = 1 |
| x = 1, | A[x] = 10, | r = 1, | s = 16, | B[x] = 17 |
| x = 2, | A[x] = 16, | r = 1, | s = 16, | B[x] = 17 |
| x = 3, | A[x] = 16, | r = 1, | s = 26, | B[x] = 27 |
| x = 4, | A[x] = 26, | r = 1, | s = 29, | B[x] = 30 |
| x = 5, | A[x] = 29, | r = 1, | s = 9, | B[x] = 10 |
| x = 7, | A[x] = 9, | r = 13, | s = 9, | B[x] = 22 |
| x = 7, | A[x] = 1, | r = 0, | s = 9, | B[x] = 9 |
| x = 8, | A[x] = 20, | r = 0, | s = 20, | B[x] = 20 |
| x = 9, | A[x] = 0, | r = 17, | s = 20, | B[x] = 37 |
| x = 10, | A[x] = 16, | r = 17, | s = 9, | B[x] = 26 |
| x = 11, | A[x] = 14, | r = 17, | s = 1, | B[x] = 18 |
| x = 12, | A[x] = 20, | r = 17, | s = 17, | B[x] = 34 |
| x = 13, | A[x] = 14, | r = 17, | s = 19, | B[x] = 36 |
| x = 14, | A[x] = 22, | r = 17, | s = 15, | B[x] = 32 |
| x = 15, | A[x] = 13, | r = 17, | s = 30, | B[x] = 47 |

*FIG. 4A*

| x = | 0 | 1 | 2 | 3 | 4 | 5 | 6 | 7 |
|---|---|---|---|---|---|---|---|---|
| A[x] = | 1 | 10 | 16 | 16 | 26 | 29 | 9 | 1 |
| r = A[x+s] = | 1 | | | | | | | |
| s = A[x+r] = | | 16 | 16 | 26 | 29 | 9 | | |
| r = A[x+s] = | | | | | | | 13 | 0 |
| B[x] = | 1 | 17 | 17 | 27 | 30 | 10 | 22 | 9 |

| x = | 8 | 9 | 10 | 11 | 12 | 13 | 14 | 15 |
|---|---|---|---|---|---|---|---|---|
| A[x] = | 20 | 0 | 16 | 14 | 20 | 14 | 22 | 13 |
| s = A[x+r] = | 20 | | | | | | | |
| r = A[x+s] = | | 17 | | | | | | |
| s = A[x+r] = | | | 9 | 1 | 17 | 19 | 15 | 30 |
| B[x] = | 20 | 37 | 26 | 18 | 34 | 36 | 32 | 47 |

*FIG. 4B*

SOURCE CODE

```
r = 0 ;
s = 0 ;
for (x=0; x<KSIZE; ++x)
{
    if (A[x] < FACTOR)
    {
        r = A[x+s] ;
    {
    else
    {
        s = A[x+r] ;
    }
    B[x] = r + s ;
}
```

FIG. 5A

VECTORIZED CODE

```
r = 0 ;
s = 0 ;
x = VectorIndex (0,1) ;
goto Loop1Tail ;
Loop1:
    s = PropagatePriorF (s,p0) ;
    ~p0; t = VectorReadInt (A, x) ;
    p1 = (t < FACTOR) ;
    i2 = ConditionalStop (p1, kTF | kFT) ;
    p2 = 0 ;
Loop2:
    !p0; p2 = GeneratePredicates (p2, i2) ;
    ~p2; t = VectorTest (p1) ;
    if ( !FIRST () ) goto Skip1 ;
    t1 = x + s ;
    ~p2; r = VectorReadInt (A, t1) ;
    goto Skip2 ;
Skip1 :
    r = PropagatePriorF (r, p2) ;
    t2 = x + r ;
    ~p2; s = VectorReadInt (A, t2) ;
    s = PropagatePostT (s, s, p2) ;
Skip2 :
    if ( !CARRY () ) goto Loop2 ;
    v = r + s ;
    ~p0; s = VectorWriteInt (B, x, v) ;
    x += VECLEN ;
Loop1Tail:
    p0 = (x < KSIZE) ;
    if ( FIRST (p0) ) goto Loop1 ;
```

FIG. 5B

EXAMPLE 2A
VECTORIZED
(NON-SPECULATIVE)

```
j = 0;
x = VectorIndex (0,1) ;
goto Loop1Tail;
Loop1:
    p3 = 0;
    j = PropagatePriorF (j, p0) ;
    ~p0; t = VectorReadInt (A, x) ;
    p1 = t < FACTOR;
    p2 = ConditionalStop (p1, kTT | kTF) ;
Loop2:
    t = x + j ;
    !p0; p3 = GeneratePredicates (p3, p2) ;
    ~p3; t = VectorTest (p1) ;
    if ( NONE () ) goto Loop2Tail ;
    !p3; p4 = p1 + 0;
    ~p4; j = VectorRead (A, t) ;
    j = PropagatePostT (j, j, p4) ;
Loop2Tail:
    if ( !CARRY () ) goto Loop2
    ~p0; VectorWrite (B, x, j) ;
    x += VECLEN;
Loop1Tail:
    p0 = (x < KSIZE) ;
    if ( FIRST () ) goto Loop1;
```

FIG. 6A

EXAMPLE 2B
VECTORIZED
(SPECULATIVE)

```
j = 0;
x = VectorIndex (0,1) ;
goto Loop1Tail ;
Loop1:
    p3 = 0 ;
    j = PropagatePriorF (j, p0) ;
Loop2:
    !p0; p5 = Remaining (p3) ;
    ~p5; t = x + j ;
    ~p5; t = VectorReadIntFF (A, t, ps) ;
    ~p5; p5 &= ps ;
    ~p5; p1 (t < FACTOR) ;
    !p5; i2 = ConditionalStop (p1, kTT | kTF) ;
    !p0; p3 = GeneratePredicates (p3, i2) ;
    ~p3; VectorTest (p1) ;
    ~p3; if (NONE () ) goto Loop2Tail ;
    !p3; p4 = p1 + 0 ;
    ~p4; j = VectorRead (A, x) ;
    j = PropagatePostT (j, j, p4) ;
Loop2Tail:
    ~p0; VectorTest (p3) ;
    if ( !LAST () ) goto Loop2 ;
    ~p0; VectorWrite (B, x, j) ;
    x += VECLEN ;
Loop1Tail:
    p0 = (x < KSIZE) ;
    if ( FIRST () ) goto Loop1 ;
```

FIG. 6B

CONCURRENT EXECUTION OF HETEROGENEOUS VECTOR INSTRUCTIONS

The present application is a continuation of U.S. application Ser. No. 13/904,660, filed May 29, 2013 (now U.S. Pat. No. 9,354,891); the disclosures of each of the above-referenced applications are incorporated by reference herein in their entireties.

BACKGROUND

1. Technical Field

This disclosure relates to processors, and more particularly to increasing instruction level parallelism for vector instructions.

2. Description of the Related Art

Processor performance can be increased by increasing the degree to which computational work can be performed concurrently. Performing multiple distinct computational tasks in parallel may not result in either task finishing more quickly—in fact, under some circumstances, the design considerations necessary to support concurrency may decrease the performance of individual tasks relative to their best-case performance. But even despite a possible performance penalty for individual tasks, concurrent processing of multiple tasks may increase the aggregate amount of processing work done per cycle, thus improving overall computational performance.

Vector processing represents one approach to increasing concurrency. Generally speaking, vector instructions may operate on multiple distinct data elements at the same time. Thus, for example, a processor executing a vector ADD instruction on vectors of elements may effectively perform a number of independent addition operations concurrently. However, if the data elements to be processed do not require the full complement of execution resources implemented by a processor, the excess resources may be underutilized, and thus effectively wasted.

SUMMARY OF THE EMBODIMENTS

Various embodiments of a method for increasing the instruction level parallelism of vector program instructions such as Macroscalar instructions are disclosed. Broadly speaking, a processor is contemplated in which a functional unit provides vector execution resources that are capable of operating on vectors of data elements having a maximum element size. In instances where multiple vector program instructions do not require the maximum element size, the multiple instructions may execute concurrently within the vector execution resources, increasing utilization of the resources that would otherwise have been underutilized if the multiple instructions had been executed serially.

In one embodiment, the processor may include an instruction issue unit that is configured to issue vector program instructions for execution. Each vector program instruction may operates on one or more vectors, each vector including multiple data elements. Each vector program instruction may operate on one of several possible element sizes including a maximum element size.

The processor may also include a functional unit configured to receive a single instance of a given vector program instruction that operates on the maximum element size. The functional unit may concurrently operate on several data elements of the given vector program instruction having the maximum element size.

The functional unit may be further configured to concurrently receive multiple vector program instructions that each operate on an element size that is less than the maximum element size. The functional unit may concurrently operate on data elements of two or more of these multiple vector program instructions, such that the multiple vector program instructions share execution resources of the functional unit that would be underutilized by execution of a single vector program instruction that operates on less than the maximum element size.

Moreover, in the processor, a maximum number of data elements per vector on which the functional unit is configured to concurrently operate may be independent of a number of vector program instructions the functional unit is configured to concurrently execute.

BRIEF DESCRIPTION OF THE DRAWINGS

FIG. 3 is a diagram illustrating an example parallelization of a program code loop.

FIG. 4A is a diagram illustrating a sequence of variable states during scalar execution of the loop shown in Example 1.

FIG. 4B is a diagram illustrating a progression of execution for Macroscalar vectorized program code of the loop of Example 1.

FIG. 5A and FIG. 5B are diagrams illustrating one embodiment of the vectorization of program source code.

FIG. 6A is a diagram illustrating one embodiment of non-speculative vectorized program code.

FIG. 6B is a diagram illustrating another embodiment of speculative vectorized program code.

Figure 1:
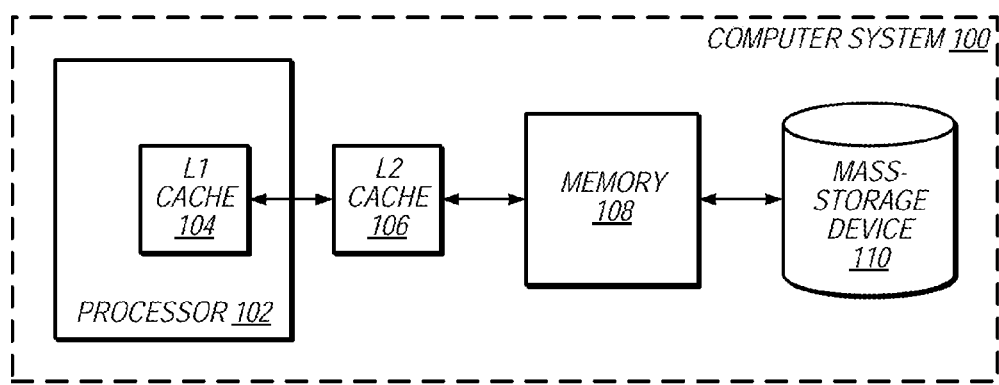
FIG. 1 is a block diagram of one embodiment of a computer system.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Computer System Overview

Turning now to FIG. 1, a block diagram of one embodiment of a computer system is shown. Computer system 100 includes a processor 102, a level two (L2) cache 106, a memory 108, and a mass-storage device 110. As shown, processor 102 includes a level one (L1) cache 104. It is noted that although specific components are shown and described in computer system 100, in alternative embodiments different components and numbers of components may be present in computer system 100. For example, computer system 100 may not include some of the memory hierarchy (e.g., memory 108 and/or mass-storage device 110). Alternatively, although the L2 cache 106 is shown external to the processor 102, it is contemplated that in other embodiments, the L2 cache 106 may be internal to the processor 102. It is further noted that in such embodiments, a level three (L3) cache (not shown) may be used. In addition, computer system 100 may include graphics processors, video cards, video-capture devices, user-interface devices, network cards, optical drives, and/or other peripheral devices that are coupled to processor 102 using a bus, a network, or another suitable communication channel (all not shown for simplicity).

In various embodiments, processor 102 may be representative of a general-purpose processor that performs computational operations. For example, processor 102 may be a central processing unit (CPU) such as a microprocessor, a microcontroller, an application-specific integrated circuit (ASIC), or a field-programmable gate array (FPGA). However, as described further below, processor 102 may include one or more mechanisms for vector processing (e.g., vector execution units). An example vector execution unit of processor 102 is described in greater detail below in conjunction with the description of FIG. 2.

The mass-storage device 110, memory 108, L2 cache 10, and L1 cache 104 are storage devices that collectively form a memory hierarchy that stores data and instructions for processor 102. More particularly, the mass-storage device 110 may be a high-capacity, non-volatile memory, such as a disk drive or a large flash memory unit with a long access time, while L1 cache 104, L2 cache 106, and memory 108 may be smaller, with shorter access times. These faster semiconductor memories store copies of frequently used data. Memory 108 may be representative of a memory device in the dynamic random access memory (DRAM) family of memory devices. The size of memory 108 is typically larger than L1 cache 104 and L2 cache 106, whereas L1 cache 104 and L2 cache 106 are typically implemented using smaller devices in the static random access memories (SRAM) family of devices. In some embodiments, L2 cache 106, memory 108, and mass-storage device 110 are shared between one or more processors in computer system 100.

In some embodiments, the devices in the memory hierarchy (i.e., L1 cache 104, etc.) can access (i.e., read and/or write) multiple cache lines per cycle. These embodiments may enable more effective processing of memory accesses that occur based on a vector of pointers or array indices to non-contiguous memory addresses.

It is noted the data structures and program instructions (i.e., code) described below may be stored on a non-transitory computer-readable storage device, which may be any device or storage medium that can store code and/or data for use by a computer system (e.g., computer system 100). Generally speaking, a non-transitory computer-readable storage device includes, but is not limited to, volatile memory, non-volatile memory, magnetic and optical storage devices such as disk drives, magnetic tape, compact discs (CDs), digital versatile discs or digital video discs (DVDs), or other media capable of storing computer-readable media now known or later developed. As such, mass-storage device 110, memory 108, L2 cache 10, and L1 cache 104 are all examples of non-transitory computer readable storage devices.

Processor

Figure 2:
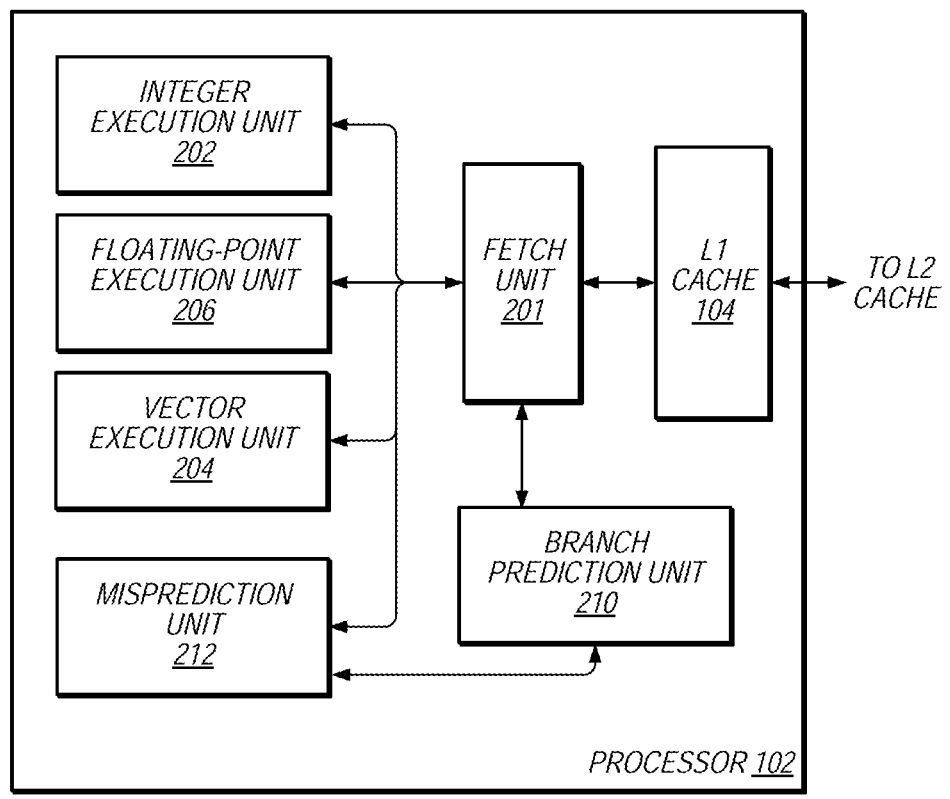
FIG. 2 is a block diagram illustrating additional details an embodiment of the processor shown in FIG. 1.

Referring to FIG. 2, a block diagram illustrating additional details of an embodiment of the processor of FIG. 1 is shown. In the embodiment shown in FIG. 2, processor 102 may include a number of pipeline stages, although for brevity not all are shown in FIG. 2. Accordingly, as shown, processor 102 includes L1 cache 104, an instruction fetch unit 201, a branch prediction unit 210, a misprediction unit 212, an integer execution unit 202, a floating-point execution unit 206, and a vector execution unit 204. It is noted that integer execution unit 202, floating-point execution unit 206, and vector execution unit 204 as a group may be interchangeably referred to as "the execution units."

In various embodiments, the execution units may perform computational operations such as logical operations, mathematical operations, or bitwise operations, for example, for an associated type of operand. More specifically, integer execution unit 202 may perform computational operations that involve integer operands, floating-point execution unit 206 may perform computational operations that involve floating-point operands, and vector execution unit 204 may perform computational operations that involve vector operands. Integer execution units and floating-point execution units are generally known in the art and are not described further for brevity. As noted above, although the embodiment of processor 102 shown in FIG. 2 includes a particular set of components, it is contemplated that in alternative embodiments processor 102 may include different numbers or types of execution units, functional units, and pipeline stages such as an instruction decode unit, a scheduler or reservations stations, a reorder buffer, a memory management unit, I/O interfaces, etc. that may be coupled to the execution units.

The vector execution unit 204 may be representative of a single-instruction-multiple-data (SIMD) execution unit in the classical sense, in that it may perform the same operation on multiple data elements in parallel. However, it is noted that in some embodiments, the vector instructions described here may differ from other implementations of SIMD instructions. For example, in an embodiment, elements of a vector operated on by a vector instruction may have a size that does not vary with the number of elements in the vector. By contrast, in some SIMD implementations, data element size does vary with the number of data elements operated on (e.g., a SIMD architecture might support operations on eight 8-bit elements, but only four 16-bit elements, two 32-bit elements, etc.). In one embodiment, the vector execution unit 204 may operate on some or all of the data elements that are included in vectors of operands. More particularly, the vector execution unit 204 may be configured to concurrently operate on different elements of a vector operand of a vector program instruction.

In one embodiment, the vector execution unit 204 may include a vector register file (not shown) which may include vector registers that can hold operand vectors and result vectors for the vector execution unit 204. In some embodiments, there may be 32 vector registers in the vector register file, and each vector register may include 128 bits. However, in alternative embodiments, there may be different numbers of vector registers and/or different numbers of bits per register.

The vector execution unit 204 may be configured to retrieve operands from the vector registers and to execute vector instructions that cause vector execution unit 204 to perform operations in parallel on some or all of the data elements in the operand vector. For example, vector execution unit 204 can perform logical operations, mathematical operations, or bitwise operations on the elements in the vector. Vector execution unit 204 may perform one vector operation per instruction cycle (although as described above, a "cycle" may include more than one clock cycle that may be used to trigger, synchronize, and/or control vector execution unit 204's computational operations).

In one embodiment, vector execution unit 204 may support vectors that hold N data elements (e.g., bytes, words, doublewords, etc.), where N may be any positive whole number. In these embodiments, vector execution unit 204 may perform operations on N or fewer of the data elements in an operand vector in parallel. For example, in an embodiment where the vector is 256 bits in length, the data elements being operated on are four-byte elements, and the operation is adding a value to the data elements, these embodiments can add the value to any number of the elements in the vector. It is noted that N may be different for different implementations of processor 102.

In various embodiments, vector execution unit 204 may include at least one control signal that enables the dynamic limitation of the data elements in an operand vector on which vector execution unit 204 operates. Specifically, depending on the state of the control signal, vector execution unit 204 may selectively operate on any or all of the data elements in the vector. For example, in an embodiment where the vector is 512 bits in length and the data elements being operated on are four-byte elements, the control signal can be asserted to prevent operations from being performed on some or all of 16 data elements in the operand vector. Note that "dynamically" limiting the data elements in the operand vector upon which operations are performed can involve asserting the control signal separately for each cycle at runtime.

In some embodiments, as described in greater detail below, based on the values contained in a vector of predicates or one or more scalar predicates, vector execution unit 204 applies vector operations to selected vector data elements only. In some embodiments, the remaining data elements in a result vector remain unaffected (which may also be referred to as "predication") or are forced to zero (which may also be referred to as "zeroing" or "zeroing predication"). In some embodiments, the clocks for the data element processing subsystems ("lanes") that are unused due to predication or zeroing in vector execution unit 204 can be power and/or clock-gated, thereby reducing dynamic power consumption in vector execution unit 204.

In various embodiments, the architecture may be vector-length agnostic to allow it to adapt parallelism at runtime. More particularly, when instructions or operations are vector-length agnostic, the operation (i.e., instruction, etc.) may be executed using vectors of any length, up to the limitations imposed by the supporting hardware. For example, in embodiments in which vector execution hardware supports vectors that can include eight separate four-byte elements (thus having a vector length of eight elements), a vector-length agnostic operation can operate on any number of the eight elements in the vector. On a different hardware implementation that supports a different vector length (e.g., four elements), the vector-length agnostic operation may operate on the different number of elements made available to it by the underlying hardware. Thus, a compiler or programmer need not have explicit knowledge of the vector length supported by the underlying hardware (e.g., vector execution unit 204). In such embodiments, a compiler generates or a programmer writes program code that need not rely on (or use) a specific vector length. In some embodiments it may be forbidden to specify a specific vector size in program code. Thus, the compiled code in these embodiments (i.e., binary code) runs on other execution units that may have differing vector lengths, while potentially realizing performance gains from processors that support longer vectors. In such embodiments, the vector length may for a given hardware unit such as a processor may be read from a system register during runtime. Consequently, as process technology allows longer vectors, execution of legacy binary code simply speeds up without any effort by software developers.

Generally, vector lengths may be implemented as powers of two (e.g., two, four, eight, etc.). However, in some embodiments, vector lengths need not be powers of two. Specifically, vectors of three, seven, or another number of data elements can be used in the same way as vectors with power-of-two numbers of data elements.

In various embodiments, each data element in the vector can contain an address that is used by vector execution unit 204 for performing a set of memory accesses in parallel. In such embodiments, if one or more elements of the vector contain invalid memory addresses, invalid memory-read operations can occur. Accordingly, invalid memory-read operations that would otherwise result in program termination may instead cause any elements with valid addresses to be read and elements with invalid elements to be flagged, allowing program execution to continue in the face of speculative, and in hindsight illegal, read operations.

In some embodiments, processor 102 (and hence vector execution unit 204) is able to operate on and use vectors of pointers. In such embodiments, the number of data elements per vector is the same as the number of pointers per vector, regardless of the size of the data type. Instructions that operate on memory may have variants that indicate the size of the memory access, but elements in processor registers should be the same as the pointer size. In these embodiments, processors that support both 32-bit and 64-bit addressing modes may choose to allow twice as many elements per vector in 32-bit mode, thereby achieving greater throughput. This implies a distinct throughput advantage to 32-bit addressing, assuming the same width data path. Implementation-specific techniques can be used to relax the requirement. For example, double-precision floating-point numbers can be supported in 32-bit mode through register pairing or some other specialized mechanism.

In one embodiment, the branch prediction unit 210 may be configured to generate branch target program counter addresses (PCs) for the fetch unit 201 for conditional branch instructions. More particularly, for conditional branch instructions, the branch prediction unit 210 may predict whether a branch will be taken or not taken and control logic (not shown) may generate the PC for the fetch unit 201 based on the prediction. Instructions may then be fetched, issued, and executed in a speculative manner dependent upon the predicted outcome of the branch. In various embodiments, the branch prediction unit 210 may use any of variety of prediction mechanisms to generate the predictions. For example, branch prediction unit 210 may use local predictors that maintain prediction state (e.g., state machines, tables, counters, or other data structures) for individual branches, global predictors that perform prediction across multiple branches considered in the aggregate, hybrid predictors that combine elements of local and global predictors, or other suitable approaches. In some embodiments, branch prediction unit 210 may employ predictors that dynamically adapt to branch behavior that varies during execution (e.g., to detect and adapt when a branch that was better predicted according to one technique becomes better predicted according to a different technique).

In one embodiment, the misprediction unit 212 is configured to detect when a branch prediction is incorrect (e.g., that the actual behavior of a branch at the time it is executed differs from the predicted behavior of the branch, indicating that the branch was mispredicted). In addition, the misprediction unit 212 may be configured to provide an indication of the misprediction to the execution units 202, 206, and 204, as well as to the branch prediction unit 210. It is noted that although the misprediction unit 212 is shown as a separate unit, it is contemplated that in other embodiments, the misprediction unit 212 may be part of the branch prediction unit 210, or it may be part of the fetch unit 201, or it may be part of any or all of the various execution units (e.g., 202, 204, and 206).

Macroscalar Architecture Overview

An instruction set architecture (referred to as the Macroscalar Architecture) and supporting hardware may allow compilers to generate program code for loops without having to completely determine parallelism at compile-time, and without discarding useful static analysis information. Various embodiments of the Macroscalar Architecture will now be described. Specifically, as described further below, a set of instructions is provided that does not mandate parallelism for loops but, instead, enables parallelism to be exploited at runtime if dynamic conditions permit. Accordingly, the architecture includes instructions that enable code generated by the compiler to dynamically switch between non-parallel (scalar) and parallel (vector) execution for loop iterations depending on conditions at runtime by switching the amount of parallelism used.

Thus, the architecture provides instructions that enable an undetermined amount of vector parallelism for loop iterations but do not require that the parallelism be used at runtime. More specifically, the architecture includes a set of vector-length agnostic instructions whose effective vector length can vary depending on runtime conditions. Thus, if runtime dependencies demand non-parallel execution of the code, then execution occurs with an effective vector length of one element. Likewise, if runtime conditions permit parallel execution, the same code executes in a vector-parallel manner to whatever degree is allowed by runtime dependencies (and the vector length of the underlying hardware). For example, if two out of eight elements of the vector can safely execute in parallel, a processor such as processor 102 may execute the two elements in parallel. In these embodiments, expressing program code in a vector-length agnostic format enables a broad range of vectorization opportunities that are not present in existing systems.

In various embodiments, during compilation, a compiler first analyzes the loop structure of a given loop in program code and performs static dependency analysis. The compiler then generates program code that retains static analysis information and instructs a processor such as processor 102, for example, how to resolve runtime dependencies and to process the program code with the maximum amount of parallelism possible. More specifically, the compiler may provide vector instructions for performing corresponding sets of loop iterations in parallel, and may provide vector-control instructions for dynamically limiting the execution of the vector instructions to prevent data dependencies between the iterations of the loop from causing an error. This approach defers the determination of parallelism to runtime, where the information on runtime dependencies is available, thereby allowing the software and processor to adapt parallelism to dynamically changing conditions. An example of a program code loop parallelization is shown in FIG. 3.

Referring to the left side of FIG. 3, an execution pattern is shown with four iterations (e.g., iterations 1-4) of a loop that have not been parallelized, where each loop includes instructions A-G. Serial operations are shown with instructions vertically stacked. On the right side of FIG. 3 is a version of the loop that has been parallelized. In this example, each instruction within an iteration depends on at least one instruction before it, so that there is a static dependency chain between the instructions of a given iteration. Hence, the instructions within a given iteration cannot be parallelized (i.e., instructions A-G within a given iteration are always serially executed with respect to the other instructions in the iteration). However, in alternative embodiments the instructions within a given iteration may be parallelizable.

As shown by the arrows between the iterations of the loop in FIG. 3, there is a possibility of a runtime data dependency between instruction E in a given iteration and instruction D of the subsequent iteration. However, during compilation, the compiler can only determine that there exists the possibility of data dependency between these instructions, but the compiler cannot tell in which iterations dependencies will actually materialize because this information is only available at runtime. In this example, a data dependency that actually materializes at runtime is shown by the solid arrows from 1E to 2D, and 3E to 4D, while a data dependency that doesn't materialize at runtime is shown using the dashed arrow from 2E to 3D. Thus, as shown, a runtime data dependency actually occurs between the first/second and third/fourth iterations.

Because no data dependency exists between the second and third iterations, the second and third iterations can safely be processed in parallel. Furthermore, instructions A-C and F-G of a given iteration have dependencies only within an iteration and, therefore, instruction A of a given iteration is able to execute in parallel with instruction A of all other iterations, instruction B can also execute in parallel with instruction B of all other iterations, and so forth. However, because instruction D in the second iteration depends on instruction E in the first iteration, instructions D and E in the first iteration must be executed before instruction D for the second iteration can be executed.

Accordingly, in the parallelized loop on the right side, the iterations of such a loop are executed to accommodate both the static and runtime data dependencies, while achieving maximum parallelism. More particularly, instructions A-C and F-G of all four iterations are executed in parallel. But, because instruction D in the second iteration depends on instruction E in the first iteration, instructions D and E in the first iteration must be executed before instruction D for the second iteration can be executed. However, because there is no data dependency between the second and third iterations, instructions D and E for these iterations can be executed in parallel.

Examples of the Macroscalar Architecture

The following examples introduce Macroscalar operations and demonstrate their use in vectorizing loops such as the loop shown in FIG. 3 and described above in the parallelized loop example. For ease of understanding, these examples are presented using pseudocode in the C++ format.

It is noted that the following example embodiments are for discussion purposes. The actual instructions and operations are merely intended to aid an understanding of the architecture. However, in alternative embodiments, instructions or operations may be implemented in a different way, for example, using a microcode sequence of more primitive operations or using a different sequence of sub-operations. Note that further decomposition of instructions is avoided so that information about the macro-operation and the corresponding usage model is not obscured.

Notation

In describing the below examples, the following format is used for variables, which are vector quantities unless otherwise noted:

p5=a<b;

Elements of vector p5 are set to 0 or 1 depending on the result of testing a<b. Note that vector p5 can be a "predicate vector," as described in more detail below. Some instructions that generate predicate vectors also set processor status flags to reflect the resulting predicates. For example, the processor status flags or condition-codes can include the FIRST, LAST, NONE, and/or ALL flags.

~p5; a=b+c;

Only elements in vector 'a' designated by active (i.e., non-zero) elements in the predicate vector p5 receive the result of b+c. The remaining elements of a are unchanged. This operation is called "predication," and is denoted using the tilde ("~") sign before the predicate vector.

!p5; a=b+c;

Only elements in vector 'a' designated by active (i.e., non-zero) elements in the predicate vector p5 receive the result of b+c. The remaining elements of a are set to zero. This operation is called "zeroing," and is denoted using the exclamation point ("!") sign before the predicate vector.

if (FIRST( )) goto . . . ; // Also Last( ), ANY( ), ALL( ), CARRY( ),
ABOVE( ), or NONE( ), (where ANY( )==!NONE( ))

The following instructions test the processor status flags and branch accordingly.

x+=VECLEN;

VECLEN is a machine value that communicates the number of elements per vector. The value is determined at runtime by the processor executing the code, rather than being determined by the assembler.

//Comment

In a similar way to many common programming languages, the following examples use the double forward slash to indicate comments. These comments can provide information regarding the values contained in the indicated vector or explanation of operations being performed in a corresponding example.

In these examples, other C++-formatted operators retain their conventional meanings, but are applied across the vector on an element-by-element basis. Where function calls are employed, they imply a single instruction that places any value returned into a destination register. For simplicity in understanding, all vectors are vectors of integers, but alternative embodiments support other data formats.

Structural Loop-Carried Dependencies

In the code Example 1 below, a program code loop that is "non-vectorizable" using conventional vector architectures is shown. (Note that in addition to being non-vectorizable, this loop is also not multi-threadable on conventional multi-threading architectures due to the fine-grain nature of the data dependencies.) For clarity, this loop has been distilled to the fundamental loop-carried dependencies that make the loop unvectorizable.

In this example, the variables r and s have loop-carried dependencies that prevent vectorization using conventional architectures. Notice, however, that the loop is vectorizable as long as the condition (A [x]<FACTOR) is known to be always true or always false. These assumptions change when the condition is allowed to vary during execution (the common case). For simplicity in this example, we presume that no aliasing exists between A[ ] and B[ ].

Example 1

Program Code Loop

```
r=0;
s=0;
for (x=0; x<KSIZE; ++x)
{
if (A[x]<FACTOR)
{
r=A[x+s];
}
else
{
s=A[x+r];
}
B[x]=r+s;
}
```

Using the Macroscalar architecture, the loop in Example 1 can be vectorized by partitioning the vector into segments for which the conditional (A[x]<FACTOR) does not change. Examples of processes for partitioning such vectors, as well as examples of instructions that enable the partitioning, are presented below. It is noted that for this example the described partitioning need only be applied to instructions within the conditional clause. The first read of A[x] and the final operation B[x]=r+s can always be executed in parallel across a full vector, except potentially on the final loop iteration.

Instructions and examples of vectorized code are shown and described to explain the operation of a vector processor such as processor 102 of FIG. 2, in conjunction with the Macroscalar architecture. The following description is generally organized so that a number of instructions are described and then one or more vectorized code samples that use the instructions are presented. In some cases, a particular type of vectorization issue is explored in a given example.

dest=VectorReadInt(Base, Offset)

VectorReadInt is an instruction for performing a memory read operation. A vector of offsets, Offset, scaled by the data size (integer in this case) is added to a scalar base address, Base, to form a vector of memory addresses which are then read into a destination vector. If the instruction is predicated or zeroed, only addresses corresponding to active elements are read. In the described embodiments, reads to invalid addresses are allowed to fault, but such faults only result in program termination if the first active address is invalid.

VectorWriteInt(Base, Offset, Value)

VectorWriteInt is an instruction for performing a memory write operation. A vector of offsets, Offset, scaled by the data size (integer in this case) is added to a scalar base address, Base, to form a vector of memory addresses. A vector of values, Value, is written to these memory addresses. If this instruction is predicated or zeroed, data is written only to active addresses. In the described embodiments, writes to illegal addresses always generate faults.

dest=VectorIndex(Start, Increment)

VectorIndex is an instruction for generating vectors of values that monotonically adjust by the increment from a scalar starting value specified by Start. This instruction can be used for initializing loop index variables when the index adjustment is constant. When predication or zeroing is applied, the first active element receives the starting value, and the increment is only applied to subsequent active elements. For example:

x=VectorIndex(0,1); //x={0 1 2 3 4 5 6 7} dest=PropagatePostT(dest, src, pred)

The PropagatePostT instruction propagates the value of active elements in src, as determined by pred, to subsequent inactive elements of dest. Active elements, and any inactive elements that precede the first active element, remain unchanged in dest. The purpose of this instruction is to take a value that is conditionally calculated, and propagate the conditionally calculated value to subsequent loop iterations as occurs in the equivalent scalar code. For example:

Entry; dest={8 9 A B C D E F}
  src={1 2 3 4 5 5 7 8}
  pred={0 0 1 1 0 0 1 0}
Exit: dest={8 9 A B 4 4 E 7} dest=PropagatePriorF(src, pred)

The PropagatePriorF instruction propagates the value of the inactive elements of src, as determined by pred, into subsequent active elements in dest. Inactive elements are copied from src to dest. If the first element of the predicate is active, then the last element of src is propagated to that position. For example:

Entry: src {1 2 3 4 5 6 7 8}
  pred={1 0 1 1 0 0 1 0}
Exit: dest={8 2 2 2 5 6 6 8} dest=ConditionalStop(pred, deps)

The ConditionalStop instruction evaluates a vector of predicates, pred, and identifies transitions between adjacent predicate elements that imply data dependencies as specified by deps. The scalar value deps can be thought of as an array of four bits, each of which designates a possible transition between true/false elements in pred, as processed from left to right. These bits convey the presence of the indicated dependency if set, and guarantee the absence of the dependency if not set. They are:

kTF—Implies a loop-carried dependency from an iteration for which the predicate is true, to the subsequent iteration for which the value of the predicate is false.

kFF—Implies a loop-carried dependency from an iteration for which the predicate is false, to the subsequent iteration for which the value of the predicate is false.

kFT—Implies a loop-carried dependency from an iteration for which the predicate is false, to the subsequent iteration for which the value of the predicate is true.

kTT—Implies a loop-carried dependency from an iteration for which the predicate is true, to the subsequent iteration for which the value of the predicate is true.

The element position corresponding to the iteration that generates the data that is depended upon is stored in the destination vector at the element position corresponding to the iteration that depends on the data. If no data dependency exists, a value of 0 is stored in the destination vector at that element. The resulting dependency index vector, or DIV, contains a vector of element-position indices that represent dependencies. For the reasons described below, the first element of the vector is element number 1 (rather than 0).

As an example, consider the dependencies in the loop of Example 1 above. In this loop, transitions between true and false iterations of the conditional clause represent a loop-carried dependency that requires a break in parallelism. This can be handled using the following instructions:

p1=(t<FACTOR); // p1={00001100}
p2=ConditionalStop(p1, kTF|kFT); // p2={00004060}

Because the 4th iteration generates the required data, and the 5th iteration depends on it, a 4 is stored in position 5 of the output vector p2 (which is the DIV). The same applies for the 7th iteration, which depends on data from the 6th iteration. Other elements of the DIV are set to 0 to indicate the absence of dependencies. (Note that in this example the first element of the vector is element number 1.)

dest=GeneratePredicates(Pred, DIV)

GeneratePredicates takes the dependency index vector, DIV, and generates predicates corresponding to the next group of elements that may safely be processed in parallel, given the previous group that was processed, indicated by pred. If no elements of pred are active, predicates are generated for the first group of elements that may safely be processed in parallel. If Pred indicates that the final elements of the vector have been processed, then the instruction generates a result vector of inactive predicates indicating that no elements should be processed and the ZF flag is set. The CF flag is set to indicate that the last element of the results is active. Using the values in the first example, GeneratePredicates operates as follows:

| Entry Conditions: | // i2 = { 0 0 0 0 4 0 6 0 } |
|---|---|
| p2 = 0; | // p2 = { 0 0 0 0 0 0 0 0 } |
| Loop2: | |
| p2 = GeneratePredicates(p2,i2); | // p2' = { 1 1 1 1 0 0 0 0 } |
| CF = 0, ZF = 0 | |
| if(!PLAST( )) goto Loop2 | // p2" = { 0 0 0 0 1 1 0 0 } |
| | CF = 0, ZF = 0 |
| | // p2'"= { 0 0 0 0 0 0 1 1 } |
| | CF = 1, ZF = 0 |

From an initialized predicate p2 of all zeros, GeneratePredicates generates new instances of p2 that partition subsequent vector calculations into three sub-vectors (i.e., p', p", and p'"). This enables the hardware to process the vector in groups that avoid violating the data dependencies of the loop.

In FIG. 4A a diagram illustrating a sequence of variable states during scalar execution of the loop in Example 1 is shown. More particularly, using a randomized 50/50 distribution of the direction of the conditional expression, a progression of the variable states of the loop of Example 1 is shown. In FIG. 4B a diagram illustrating a progression of execution for Macroscalar vectorized program code of the loop of Example 1 is shown. In FIG. 4A and FIG. 4B, the values read from A[ ] are shown using leftward-slanting hash marks, while the values written to B[ ] are shown using rightward-slanting hash marks, and values for "r" or "s" (depending on which is changed in a given iteration) are shown using a shaded background. Observe that "r" never changes while "s" is changing, and vice-versa.

Nothing prevents all values from being read from A[ ] in parallel or written to B[ ] in parallel, because neither set of values participates in the loop-carried dependency chain. However, for the calculation of r and s, elements can be processed in parallel only while the value of the conditional expression remains the same (i.e., runs of true or false). This pattern for the execution of the program code for this loop is shown in of FIG. 4B. Note that the example uses vectors having eight elements in length. When processing the first vector instruction, the first iteration is performed alone (i.e., vector execution unit 204 processes only the first vector element), whereas iterations 1-5 are processed in parallel by vector execution unit 204, and then iterations 6-7 are processed in parallel by vector execution unit 204.

Referring to FIG. 5A and FIG. 5B, diagrams illustrating one embodiment of the vectorization of program code are shown. FIG. 5A depicts the original source code, while FIG. 5B illustrates the vectorized code representing the operations that may be performed using the Macroscalar architecture. In the vectorized code of FIG. 5B, Loop 1 is the loop from the source code, while Loop 2 is the vector-partitioning loop that processes the sub-vector partitions.

In the example, array A[ ] is read and compared in full-length vectors (i.e., for a vector of N elements, N positions of array A[ ] are read at once). Vector i2 is the DIV that controls partitioning of the vector. Partitioning is determined by monitoring the predicate p1 for transitions between false and true, which indicate loop-carried dependencies that should be observed. Predicate vector p2 determines which elements are to be acted upon at any time. In this particular loop, p1 has the same value in all elements of any sub-vector partition; therefore, only the first element of the partition needs to be checked to determine which variable to update.

After variable "s" is updated, the PropagatePostT instruction propagates the final value in the active partition to subsequent elements in the vector. At the top of the loop, the PropagatePriorF instruction copies the last value of "s" from the final vector position across all elements of the vector in preparation for the next pass. Note that variable "r" is propagated using a different method, illustrating the efficiencies of using the PropagatePriorF instruction in certain cases.

Software Speculation

In the previous example, the vector partitions prior to the beginning of the vector-partitioning loop could be determined because the control-flow decision was independent of the loop-carried dependencies. However, this is not always the case. Consider the following two loops shown in Example 2A and Example 2B:

Example 2A

Program Code Loop 1

```
j=0;
for (x=0; x<KSIZE; ++x)
{
if (A[x]<FACTOR)
{
j=A[x+j];
}
B[x]=j;
}
```

Example 2B

Program Code Loop 2

```
j=0;
for (x=0; x<KSIZE; ++x)
{
if (A[x+j]<FACTOR)
{
j=A[x];
}
B[x]=j;
}
```

In Example 2A, the control-flow decision is independent of the loop-carried dependency chain, while in Example 2B the control flow decision is part of the loop-carried dependency chain. In some embodiments, the loop in Example 2B may cause speculation that the value of "j" will remain unchanged and compensate later if this prediction proves incorrect. In such embodiments, the speculation on the value of "j" does not significantly change the vectorization of the loop.

In some embodiments, the compiler may be configured to always predict no data dependencies between the iterations of the loop. In such embodiments, in the case that runtime data dependencies exist, the group of active elements processed in parallel may be reduced to represent the group of elements that may safely be processed in parallel at that time. In these embodiments, there is little penalty for mispredicting more parallelism than actually exists because no parallelism is actually lost (i.e., if necessary, the iterations can be processed one element at a time, in a non-parallel way). In these embodiments, the actual amount of parallelism is simply recognized at a later stage.

dest=VectorReadIntFF(Base, Offset, pf)

VectorReadIntFF is a first-faulting variant of VectorReadInt. This instruction does not generate a fault if at least the first active element is a valid address. Results corresponding to invalid addresses are forced to zero, and flags pf are returned that can be used to mask predicates to later instructions that use this data. If the first active element of the address is unmapped, this instruction faults to allow a virtual memory system in computer system 100 (not shown) to populate a corresponding page, thereby ensuring that processor 102 can continue to make forward progress.

dest=Remaining(Pred)

The Remaining instruction evaluates a vector of predicates, Pred, and calculates the remaining elements in the vector. This corresponds to the set of inactive predicates following the last active predicate. If there are no active elements in Pred, a vector of all active predicates is returned. Likewise, if Pred is a vector of all active predicates, a vector of inactive predicates is returned. For example:

Entry: pred={0 0 1 0 1 0 0 0}
Exit: dest={0 0 0 0 0 1 1 1}

FIG. 6A and FIG. 6B are diagrams illustrating embodiments of example vectorized program code. More particularly, the code sample shown in FIG. 6A is a vectorized version of the code in Example 2A (as presented above). The code sample shown in FIG. 6B is a vectorized version of the code in Example 2B. Referring to FIG. 6B, the read of A[ ] and subsequent comparison have been moved inside the vector-partitioning loop. Thus, these operations presume (speculate) that the value of "j" does not change. Only after using "j" is it possible to determine where "j" may change value. After "j" is updated, the remaining vector elements are re-computed as necessary to iterate through the entire vector. The use of the Remaining instruction in the speculative code sample allows the program to determine which elements remain to be processed in the vector-partitioning loop before the program can determine the sub-group of these elements that are actually safe to process (i.e., that don't have unresolved data dependencies).

In various embodiments fault-tolerant read support is provided. Thus, in such embodiments, processor 102 may speculatively read data from memory using addresses from invalid elements of a vector instruction (e.g., VectorReadFF) in an attempt to load values that are to be later used in calculations. However, upon discovering that an invalid read has occurred, these values are ultimately discarded and, therefore, not germane to correct program behavior. Because such reads may reference non-existent or protected memory, these embodiments may be configured to continue normal execution in the presence of invalid but irrelevant data mistakenly read from memory. (Note that in embodiments that support virtual memory, this may have the additional benefit of not paging until the need to do so is certain.)

In the program loops shown in FIG. 6A and FIG. 6B, there exists a loop-carried dependency between iterations where the condition is true, and subsequent iterations, regardless of the predicate value for the later iterations. This is reflected in the parameters of the Conditional Stop instruction.

The sample program code in FIG. 6A and FIG. 6B highlights the differences between non-speculative and speculative vector partitioning. More particularly, in Example 2A memory is read and the predicate is calculated prior to the ConditionalStop. The partitioning loop begins after the Conditional Stop instruction. However, in Example 2B, the ConditionalStop instruction is executed inside the partitioning loop, and serves to recognize the dependencies that render earlier operations invalid. In both cases, the GeneratePredicates instruction calculates the predicates that control which elements are used for the remainder of the partitioning loop.

Concurrent Execution of Multiple Macroscalar Instructions

As described above, Macroscalar instructions operate on operand vectors that include multiple data elements. Typically, a given implementation of a Macroscalar processor may support concurrent operations on an implementation-specific number of elements, which may also be referred to as the vector length. That is, while the Macroscalar architecture may be vector-length agnostic from the programmer's perspective, particular implementations may vary in the degree to which they support concurrent operations. For example, one implementation may support concurrent operations on up to four elements, while another supports concurrent operations on up to eight elements. This difference may be transparent to software, in that the same Macroscalar source code may execute on both implementations without modification, although with potentially different performance.

In addition to supporting a particular number of concurrent elements, a particular Macroscalar processor implementation may also support a maximum element width. For example, a processor may operate on elements that are at most 64 bits wide, although it may also operate on smaller elements.

Figure 7:
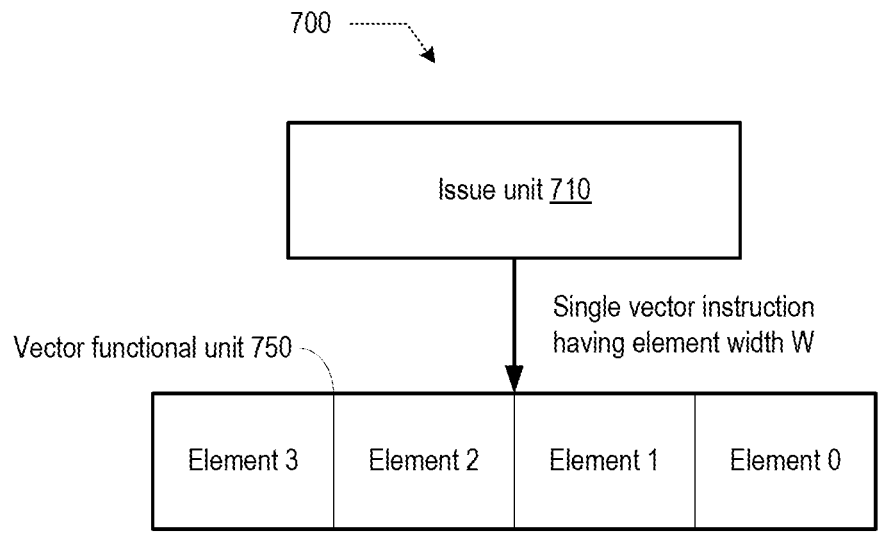
FIG. 7 illustrates an example embodiment of a vector functional unit.

FIG. 7 illustrates an example arrangement of a processor that is configured to operate on Macroscalar vectors. In the illustrated embodiment, processor 700 may include an instruction issue unit 710 and a vector functional unit 750. Processor 700 may be an example of processor 102 as discussed above with respect to FIGS. 1 and 2. In such embodiments, instruction issue unit 710 may correspond to or be included within fetch unit 201 of FIG. 2, and vector functional unit 750 may correspond to or be included within vector execution unit 204 of FIG. 2. Processor 700 may include any other suitable components, such as caches, register files, branch predictors, scalar functional units, control logic, and/or other features, depending on the implementation.

For purposes of this discussion, it is assumed that vector functional unit 750 is capable of concurrently operating on four distinct vector elements, each having a maximum element width of W. For example, where W=64 bits, vector functional unit 750 may concurrently operate on vector operands that include up to four vector elements of up to 64 bits each. It is noted that in other embodiments, vector functional unit 750 may support concurrent operations on more or fewer than four distinct vector elements, and the element width W may be larger or smaller than 64 bits.

As shown in FIG. 7, during operation, issue unit 710 may be configured to issue a single vector instruction to vector functional unit 750, where each of the elements to be processed by the instruction has an element width of W (i.e., the maximum element width supported by processor 700). Vector functional unit 750 may then operate on as many of the elements as is permitted, e.g., by predication information accompanying the vector instruction. For example, vector functional unit 750 may be configured to operate on only those element positions indicated as active by a predicate vector, as discussed above.

In some embodiments of the Macroscalar architecture, it may be a requirement that the number of elements on which a processor may concurrently operate must remain constant regardless of the width of the elements. That is, if the processor is capable of concurrently processing at most N elements of width W, it must concurrently process N elements even if the element width is less than W. For example, where N=4 and W=64, in a processor subject to this constant vector length property, an instruction will operate on operands having at most 4 elements regardless of whether the elements fully occupy the 64 bit element width. Put another way, in such a processor, the number of vector elements of a vector operand that are concurrently operated on may be said to be invariant or independent of the element width.

Thus, the constant vector length property is in contrast to conventional single instruction multiple data (SIMD) processor implementations, in which the number of data elements concurrently operated by an instruction is directly dependent upon the element size, and increases or decreases as the element size becomes smaller or larger. For example, assume that the configuration of FIG. 7 supports concurrent operations on four 64-bit elements, thus providing a datapath that is effectively 256 bits wide. In a Macroscalar implementation where the constant vector length property applies, for a given vector instruction, vector functional unit 750 will concurrently process at most four distinct elements of a vector operand, regardless of whether the elements are, e.g., 8, 16, 32, or 64 bits wide. By contrast, in a conventional SIMD machine, a given SIMD instruction operating on a 256-bit datapath would concurrently process a variable number of elements that depends on the element width. For example, such a datapath might process two 128-bit elements, four 64-bit elements, eight 32-bit elements, sixteen 16-bit elements, or thirty-two 8-bit elements.

It can be appreciated from FIG. 7 that in a constant vector length machine, if the elements being processed by a given Macroscalar instruction have a width less than the full element width W, portions of the datapath within vector functional unit 750 may be underutilized. For example, if vector functional unit 750 is implemented to support 64-bit elements, and a 32-bit version of a Macroscalar instruction is issued from issue unit 710, then the datapath logic within vector functional unit 750 may be only half utilized by the issued instruction.

That is, vector functional unit 750 may include various physical execution resources with which to process data, such as adders, shifters, multipliers, Boolean logic, circuitry supporting floating-point arithmetic, and/or circuitry supporting other types of operations (such as graphics-related or other functions that may be implemented within execution hardware). Such physical resources may be configured to operate on operands of a maximum width W such as, e.g., 64 bits. Thus, vector functional unit 750 may include 64-bit adders, shifters, or other types of datapath circuitry. In the event that a Macroscalar instruction operating on only 32-bit or 16-bit elements is issued to vector functional unit 750, then the remaining capacity of the datapath is not needed to process that instruction.

Figure 8:
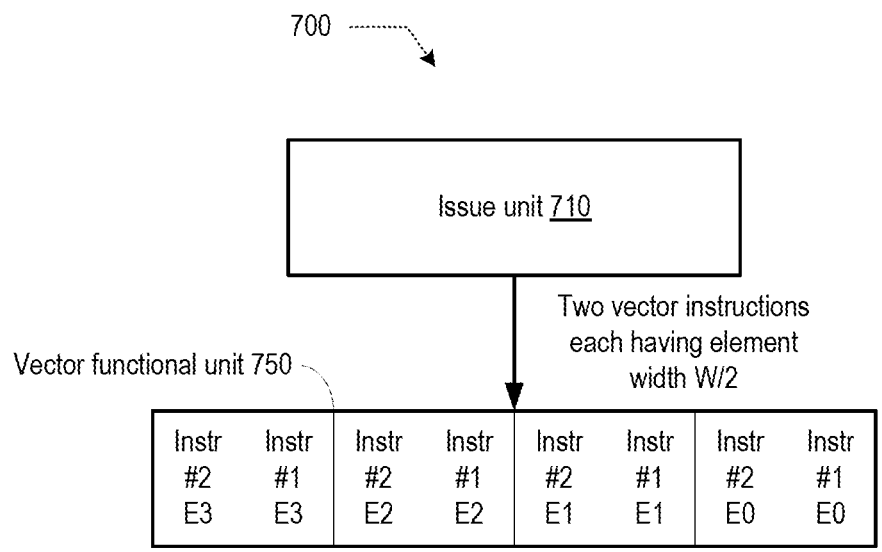
FIG. 8 illustrates an example embodiment of a vector functional unit configured to concurrently execute multiple distinct vector program instructions.

In some embodiments of processor 700, when issue unit 710 issues a Macroscalar instruction that operates on an element width less than W, the excess datapath capacity of vector functional unit 750 that consequently arises may be repurposed to concurrently execute an additional Macroscalar instruction also operating on an element width less than W. FIG. 8 illustrates an example of such a configuration. In the illustrated embodiment, issue unit 710 may be configured to concurrently issue two distinct vector instructions to vector functional unit 750, each of which operates on elements having a width of W/2. It is noted that the concurrently issued instructions may be entirely distinct, in that they may be associated with distinct program counter addresses, may be independent of one another (i.e., possess no data or control dependencies with respect to one another), and may otherwise be capable of being issued serially and executed separately rather than concurrently.

As shown in FIG. 8, the elements operated on by two distinct instructions may concurrently occupy distinct portions of the datapath of vector functional unit 750, with the elements of the second instruction occupying the portion not utilized by the first. In the illustrated example, where processor 700 has a vector length of 4, each Macroscalar instruction may operate on up to four elements denoted 0, 1, 2, and 3. In the scenario illustrated in FIG. 8, element 0 of each distinct instruction of width W/2 may occupy the same portion of the datapath of vector functional unit 750 that is occupied by element 0 of a single instruction of width W, with a similar arrangement applying to elements 1, 2, and 3. In the illustrated embodiment, one instruction having element width W/2 may uniformly occupy the lower-order half of the datapath, while the other may uniformly occupy the upper-order half; which instruction occupies which portion may be determined according to program order or any other suitable factor.

Figure 9:
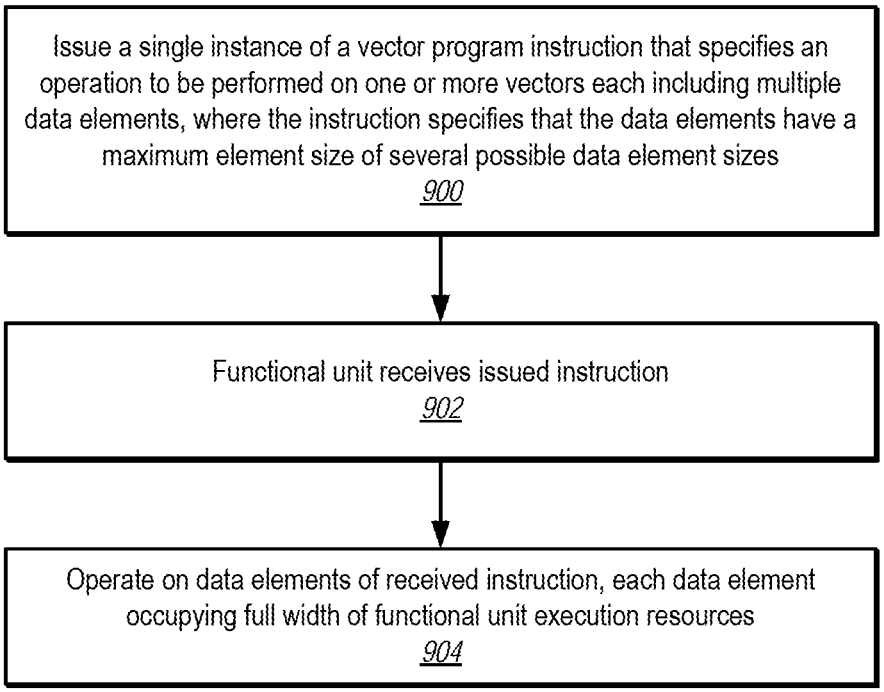
FIGS. 9 and 10 are flow diagrams illustrating examples of operation of a vector functional unit configured to execute single and multiple distinct program instructions.
Figure 10:
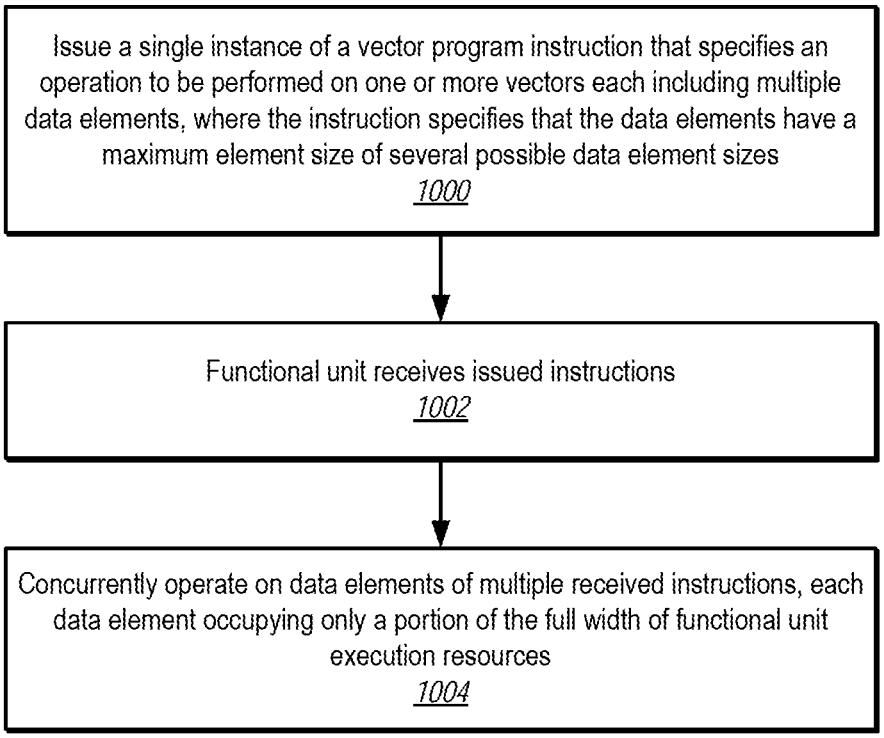

FIGS. 9-10 illustrate possible methods of operation of a processor embodiment configured as described above with respect to FIGS. 7 and 8. As to FIG. 9, operation begins in block 900 with the issuing of a single instance of a vector program instruction that specifies an operation to be performed on one or more vectors each including multiple data elements, where the instruction operates on data elements that have a maximum element size of several possible data element sizes. For example, as noted above with respect to FIG. 7, issue unit 710 may issue a single Macroscalar instruction that operates on one or more vector operands, each operand including N elements (e.g., 4, 8, or some other number of elements), and each element having a width of W bits, W being the maximum possible vector data element size defined for processor 700. In various embodiments, the element size may be encoded within the instruction itself, or may be encoded within other information distinct from the instruction, such as within a predicate corresponding to the instruction or an operand of the instruction.

The issued instruction may then be received by a functional unit (block 902). For example, vector functional unit 750 may receive the issued Macroscalar instruction from issue unit 710.

The data elements of the received instruction may then be concurrently operated on, with the data elements each occupying the full width of the functional unit's execution resources (block 904). For example, vector functional unit 750 may execute the received Macroscalar instruction by operating on the active elements of the received vector operand(s) to produce a vector result. In this case, because each element has a width of W bits, it fully occupies the datapath logic associated with that element position, as illustrated in FIG. 7.

By contrast, in FIG. 10, operation begins with the issuing of multiple vector program instructions, each specifying an operation to be performed on one or more vectors each including multiple data elements, where each instruction operates on an element size that is less than the maximum element size (block 1000). For example, as noted above with respect to FIG. 8, issue unit 710 may issue a multiple Macroscalar instructions that each operate on one or more vector operands, each operand including N elements (e.g., 4, 8, or some other number of elements), and each element having a width of W/2 bits (as shown in FIG. 8) or some other suitable width less than the maximum.

The issued instructions may then be received by a functional unit (block 1002). For example, vector functional unit 750 may receive the multiple issued Macroscalar instructions from issue unit 710.

The data elements of the received instructions may then be concurrently operated on, with the data elements each occupying only a portion of the full width of the functional unit's execution resources (block 1004). For example, vector functional unit 750 may execute the received Macroscalar instructions by operating on the active elements of the received vector operands to produce multiple distinct vector results corresponding to the multiple instructions. In this example case, because each element has a width of W/2 bits, it occupies only half of the datapath logic associated with that element position, with the other half being occupied by the element corresponding to a different instruction, as illustrated in FIG. 8.

It is noted that in some embodiments, determining whether one or multiple Macroscalar vector instructions may be issued at any given opportunity may be independent of whether one or several instructions were issued at the previous opportunity. Thus, for example, issue unit 710 may be constrained in issuing multiple instructions only by the availability of instructions ready to issue and their characteristics, subject to any implementation-specific issue constraints that may be employed as to the types of instructions that may be issued for concurrent execution.

As can be seen from the foregoing, the concurrent execution of multiple Macroscalar instructions within vector functional unit 750 may permit the instructions to share execution resources that would otherwise be underutilized if the multiple instructions executed individually rather than concurrently. Further, it can be observed from the foregoing that the constant vector length property is preserved whether a single Macroscalar instruction or multiple Macroscalar instructions are concurrently executing in vector functional unit 750: that is, the maximum number of data elements per vector on which vector functional unit 750 can concurrently operate is independent of the number of vector program instructions that are concurrently executed. Thus, for example, vector functional unit 750 may process four elements per vector, regardless of whether it is executing one Macroscalar instruction on 64-bit elements, two Macroscalar instructions on 32-bit elements, four Macroscalar instructions on 16-bit elements, and so forth.

Although FIG. 8 shows two instructions operating on elements having a width of W/2 concurrently executing within vector functional unit 750, it is contemplated that in some embodiments, vector functional unit 750 may support concurrent execution of varying numbers of Macroscalar instructions, depending on the element width specified by the instructions. For example, vector functional unit 750 may concurrently execute four Macroscalar instructions each having an element width of W/4, eight instructions having width W/8, and so forth. In each case, it is noted that the constant vector length property may be preserved: although the numbers of concurrently executing instructions and their element widths may vary, in each instance, the number of vector elements operated on per instruction remains constant (e.g., 4 in the case of FIG. 8).

Although the number of concurrently executing instructions may commonly be a multiple of 2, this is not essential, and it is contemplated that vector functional unit 750 may also support odd multiples of concurrently executing instructions. In some such embodiments, each instruction may receive a roughly equal share of the execution resources. For example, where W=64 bits, three concurrently executing instructions may each operate on elements of 21 bits, with the remaining bit position of the execution resources either being unutilized or allocated to one of the instructions.

It is noted that although each of the concurrently executing Macroscalar instructions may operate on identically-sized elements, this is not necessarily the case. In some embodiments, the multiple instructions may have heterogeneous element widths. For example, where W=64 bits, vector functional unit 750 might concurrently execute one instruction having W/2 or 32-bit elements in one half of the datapath, and two instructions each having W/4 or 16-bit elements in the other half of the datapath, for a total of three concurrently executing Macroscalar instructions, each operating on at most four data elements. Any other suitable combination may also be employed, including combinations that do not necessarily utilize all of the execution resources of vector functional unit 750 (e.g., in the case of W=64, five 8-bit instructions along with one 16-bit instruction).

The types of Macroscalar instructions that may concurrently execute within vector functional unit 750 in the fashion described above may vary in different embodiments of processor 700. In some embodiments, the complexity of issue unit 710 may be reduced by requiring the concurrently executing instructions to specify identical operations (e.g., all must perform the same arithmetic, shift, Boolean, or other operation). In other embodiments, the issue constraints implemented by issue unit 710 may require only that the multiple instructions all be of the same type (e.g., all arithmetic, though different instructions may specify different arithmetic operations; all shift, though different instructions may specify different shift operations, etc.). In still other embodiments, the only prerequisite to concurrently issuing Macroscalar instructions may be that each of the concurrently issued instructions execute with the same execution latency (i.e., all require the same number of execution cycles to produce a result, such as one cycle, two cycles, etc.).

In some embodiments, vector functional unit 750 may include distinct subunits that perform different types of operations, possibly with different latencies. For example, vector functional unit 750 may include a single-cycle integer subunit that is configured to perform integer operations (e.g., certain arithmetic operations, logical/shift operations, etc.) with a single cycle of execution latency, as well as a multiple-cycle floating-point subunit configured to perform floating-point operations (e.g., addition/subtraction, multiplication, division, transcendentals, etc.) with multiple, and possible variable, cycles of latency. Other subunits may also be employed, such as a subunit for multiple-cycle integer operations such as multiplication or division.

Figure 11:
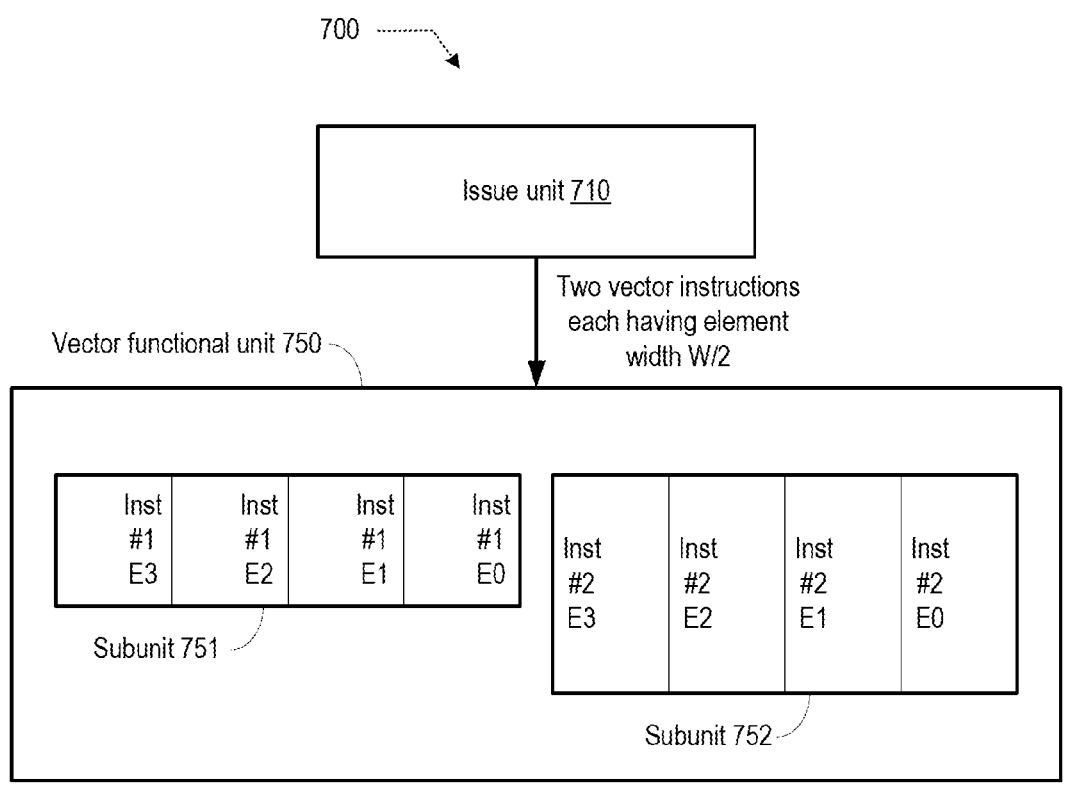
FIG. 11 illustrates an example embodiment of a vector functional unit having multiple subunits of differing execution latencies.

The techniques discussed above with respect to concurrently executing multiple Macroscalar instructions on elements of less than the maximum width W may be extended to embodiments in which vector functional unit 750 includes subunits of differing execution latencies. One such embodiment is illustrated in FIG. 11. In the illustrated embodiment, vector functional unit 750 is shown to include two subunits 751 and 752 having dissimilar execution latencies, although other embodiments may employ different numbers and configurations of subunits.

As shown, issue unit 710 may issue two Macroscalar instructions each operating on element widths of W/2, where one of the instructions is executed by subunit 751 and the other is executed by subunit 752. In some embodiments, issue unit 710 may be configured to issue multiple vector instructions to multiple subunits only in the event that all of the subunits involved have fixed rather than variable latencies. (For example, in some embodiments, certain iterative operations such as division or square root may operate with latencies that vary depending upon the data operated upon, which may make such operations more difficult to coordinate with other concurrent operations.) Although the instructions are shown executing in the lower portion of subunit 751 and the upper portion of subunit 752, in various embodiments, the multiple instructions may be aligned in any suitable fashion within the subunits, and multiplexers or other circuits may be employed to arrange the elements output from the subunits in a format suitable for being output from vector functional unit 750.

In various embodiments, the latency difference between subunits may be addressed in different ways. For example, the result of the shorter latency subunit 751 may be held until the result from the longer latency subunit 752 is available, effectively stalling the shorter latency subunit 751. Alternatively, fine-grained control may be provided with respect to result writeback (e.g., when a result vector contains results from multiple vector instructions having element width less than W, selectively permitting only results from certain instructions to be written back). In such embodiments, the result of the instruction being executing by shorter latency subunit 751 may be written back when it is available, and other instructions may continue to issue to subunit 751 while subunit 752 continues to execute the longer latency instruction.

As noted above with respect to FIGS. 7-8, further variations of FIG. 11 are possible with respect to the number of subunits provided, the number of instructions that may concurrently execute, and the variety of element widths that are supported. Moreover, it is contemplated that multiple Macroscalar instructions may be issued to individual ones of subunits 751 and 752 in a manner similar to that described above with respect to FIGS. 7-8.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processor, comprising:
   an instruction issue unit configured to issue vector program instructions for execution, where each vector program instruction operates on one or more vectors, each vector including a plurality of data elements, wherein each vector program instruction operates on one of a plurality of possible element sizes, wherein the plurality of possible element sizes includes a maximum element size; and
   a functional unit configured to execute a single instance of a given vector program instruction that operates on the maximum element size;
   wherein the functional unit is further configured to concurrently execute a plurality of vector program instructions that each operate on an element size that is less than the maximum element size;
   wherein for at least two of the plurality of vector program instructions that each operate on an element size that is less than the maximum element size, the at least two vector program instructions: implement different computational operations, execute with different latencies, operate on data elements of different sizes, execute in different subunits of the functional unit, or any combination thereof; and
   wherein a maximum number of data elements per vector on which the functional unit is configured to concurrently operate is independent of a number of vector program instructions the functional unit is configured to concurrently execute.

2. The processor of claim 1, wherein the vector program instructions are defined according to the Macroscalar instruction set architecture.

3. The processor of claim 1, wherein the different subunits of the functional unit include at least an integer subunit and a floating-point subunit.

4. The processor of claim 1, wherein a number of data elements on which the functional unit is configured to concurrently operate is a constant that is independent of data element size.

5. The processor of claim 1, wherein for a particular one of the plurality of vector program instructions, an element size is encoded within the particular vector program instruction.

6. The processor of claim 1, wherein for a particular one of the plurality of vector program instructions, an element size is encoded within a predicate corresponding to the particular vector program instruction or to an operand of the particular vector program instruction.

7. The processor of claim 1, wherein the at least two of the plurality of vector program instructions include one vector program instruction that operates on data elements having one half of the maximum element size and two vector program instructions that each operate on data elements having one quarter of the maximum element size.

8. A method, comprising:
   performing, by a processor:
      issuing vector program instructions for execution, where each vector program instruction operates on one or more vectors, each vector including a plurality of data elements, wherein each vector program instruction operates on one of a plurality of possible element sizes, wherein the plurality of possible element sizes includes a maximum element size;
      for a single instance of a given vector program instruction that operates on the maximum element size, concurrently operating on a plurality of data elements of the given vector program instruction having the maximum element size;
      for two or more vector program instructions that each operate on an element size that is less than the maximum element size, concurrently operating on data elements of the two or more vector program instructions that operate on less than the maximum element size;
   wherein the two or more vector program instructions: implement different computational operations, execute with different latencies, operate on data elements of different sizes, execute in different subunits of a functional unit, or any combination thereof; and
   wherein a maximum number of data elements per vector on which concurrent operation can be performed is independent of a number of vector program instructions that are concurrently executable.

9. The method of claim 8, wherein the vector program instructions are defined according to the Macroscalar instruction set architecture.

10. The method of claim 8, wherein a number of data elements on which concurrent operation is performed is a constant that is independent of data element size.

11. The method of claim 8, wherein for a particular one of the vector program instructions, an element size is encoded within the particular vector program instruction.

12. The method of claim 8, wherein for a particular one of the vector program instructions, an element size is encoded within a predicate corresponding to the particular vector program instruction or to an operand of the particular vector program instruction.

13. The method of claim 8, wherein the two or more of the plurality of vector program instructions include one vector program instruction that operates on data elements having one half of the maximum element size and two vector program instructions that each operate on data elements having one quarter of the maximum element size.

14. A system, comprising:
   a memory; and a processor coupled to the memory, wherein the processor comprises:
an instruction issue unit configured to issue vector program instructions for execution, where each vector program instruction operates on one or more vectors, each vector including a plurality of data elements, wherein each vector program instruction operates on one of a plurality of possible element sizes, wherein the plurality of possible element sizes includes a maximum element size; and
a functional unit configured to execute a single instance of a given vector program instruction that operates on the maximum element size;
wherein the functional unit is further configured to concurrently execute a plurality of vector program instructions that each operate on an element size that is less than the maximum element size;
wherein for at least two of the plurality of vector program instructions that each operate on an element size that is less than the maximum element size, the at least two vector program instructions: implement different computational operations, execute with different latencies, operate on data elements of different sizes, execute in different subunits of the functional unit, or any combination thereof; and
wherein a maximum number of data elements per vector on which the functional unit is configured to concurrently operate is independent of a number of vector program instructions the functional unit is configured to concurrently execute.

15. The system of claim 14, wherein the vector program instructions are defined according to the Macroscalar instruction set architecture.

16. The system of claim 14, wherein the different subunits of the functional unit include at least an integer subunit and a floating-point subunit.

17. The system of claim 14, wherein a number of data elements on which the functional unit is configured to concurrently operate is a constant that is independent of data element size.

18. The system of claim 14, wherein for a particular one of the plurality of vector program instructions, an element size is encoded within the particular vector program instruction.

19. The system of claim 14, wherein for a particular one of the plurality of vector program instructions, an element size is encoded within a predicate corresponding to the particular vector program instruction or to an operand of the particular vector program instruction.

20. The system of claim 14, wherein the at least two of the plurality of vector program instructions include one vector program instruction that operates on data elements having one half of the maximum element size and two vector program instructions that each operate on data elements having one quarter of the maximum element size.

* * * * *